March 11, 1924. Re. 15,791

P. LEIKEN

KNICKERS

Original Filed Oct. 21, 1921

Philip Leiken INVENTOR

BY

Schechter & Kobel his ATTORNEYS

Reissued Mar. 11, 1924. Re. 15,791

UNITED STATES PATENT OFFICE.

PHILIP LEIKEN, OF BROOKLYN, NEW YORK, ASSIGNOR TO THE PEERLESS SMOKING JACKET CO., INC., OF NEW YORK, N. Y., A CORPORATION OF NEW YORK.

KNICKERS.

Original No. 1,423,668, dated July 25, 1922, Serial No. 509,393, filed October 21, 1921. Application for reissue filed January 17, 1924. Serial No. 686,930.

*To all whom it may concern:*

Be it known that PHILIP LEIKEN, a citizen of the United States of America, and resident of 1606 President Street, Brooklyn, in the county of Kings and State of New York, has invented certain new and useful Improvements in Knickers, of which the following is a specification.

This invention relates to sports' knickerbockers and is particularly applicable to golf knickerbockers, the chief object being to provide means whereby the legs of the garment may take to and grip the limbs of the wearer without the necessity of using buckles, buttons or other securing devices. The desired object is obtained by providing the legs of the garment with elastic knit cuffs which are of such character that the garment may be readily slipped on and retained with the legs thereof in correct relation to the limbs of the wearer.

In order that the said invention may be clearly understood and readily carried into effect the same will now be described more fully with reference to the accompanying drawing, in which.

Figure 1:
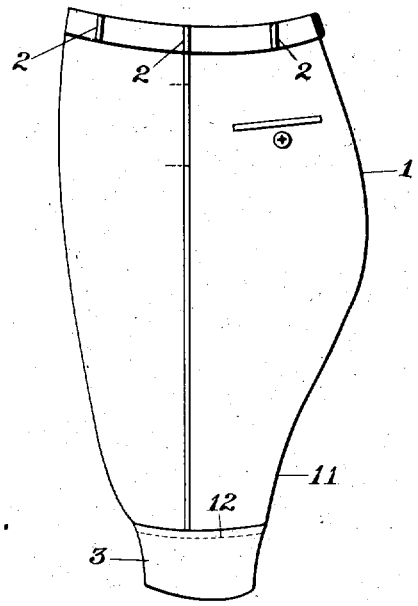
Figure 1 shows a pair of golf knickerbockers embodying the invention.
Figure 2:
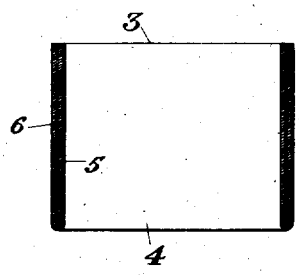
Figure 2 is a cross sectional view of a cuff and Figure 3 is a similar view showing a method of securing the same to the knickerbocker's leg.
Figure 3:
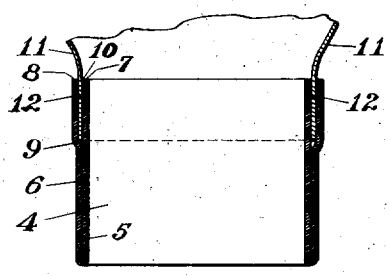

The knickers 1 are cut on conventional lines and are provided with the loops 2 for receiving the belt for retaining the upper part of the garment in position. At the lower extremity of each leg a cuff 3 is provided for gripping the limb of the wearer below the knee. The cuffs are made of tubular knitted woolen fabric or cloth and are highly elastic and adapted to stretch and contract in use. Each cuff 3, as shown in Figure 2, is made of a single piece of tubular material 4, which is doubled back on itself to form two layers 5 and 6. When the cuff is to be applied to the leg of the garment the ends 7 and 8 of the layers 5 and 6 are suitably distended to form a pocket 9 for receiving the lower end 10 of the knickerbocker's leg 11, and when the parts are in the position shown in Figure 3 they are suitably secured together by sewing 12.

It will be understood that the improved double or two fold cuff presents considerable elasticity and owing to its formation will retain such elasticity during the life of the garment and thereby ensure good fit at all times.

What I claim and desire to secure by Letters Patent is:

1. As an article of outer wearing apparel, a knickerbocker of woven material, each leg thereof being provided with a cuff extending substantially below said leg and comprising a continuous length of elastic tubular knitted material, doubled back upon itself and secured to form a lower folded edge, said knitted material being permanently secured to said leg.

2. As an article of outer wearing apparel, a knickerbocker of woven material, each leg thereof being provided with a cuff extending substantially below said leg and comprising a continuous length of elastic tubular knitted material, doubled back upon itself and secured to form a lower folded edge, and having one of its ends permanently secured to said leg.

3. As an article of outer wearing apparel, a knickerbocker of woven material, each leg thereof being provided with a cuff of double elastic tubular knitted material, fixedly held in such doubled relation, said knitted material being permanently secured to said leg.

4. A knickerbocker of woven material, having permanently affixed to each leg an elastic knitted cuff, doubled back upon itself to form a lower folded edge, the doubled portions being secured together at a point above said edge.

5. As an article of outer wearing apparel, a knickerbocker of woven material, each leg thereof being provided with a cuff extending substantially below said leg and comprising a continuous length of elastic tubular knitted material doubled back upon itself to form a folded edge, the two ends being permanently secured to the said leg.

This specification signed this 12 day of January, 1924.

PHILIP LEIKEN.